3,014,834
PROCESS FOR PRODUCING LAMINATED BOARD
Donald K. Pattilloch, New York, N.Y., assignor to Michigan Research Laboratories, Inc., Long Island City, N.Y., a corporation of Michigan, and Electro-Chem Fiber Seal Corporation, New York, N.Y., a corporation of Delaware
No Drawing. Filed May 1, 1957, Ser. No. 656,223
5 Claims. (Cl. 162—132)

This invention relates to laminated board and processes for making same and more particularly to laminated board prepared from resin-fiber sheets.

Prior art laminated boards have been made primarily by saturating a paper sheet or the like with a resin and then bonding a plurality of said sheets together under heat and pressure. It is among the objects of the present invention to avoid the saturation step and to prepare a resin-fiber sheet directly by paper-making techniques.

The process of the invention generally comprises treating an aqueous suspension of cellulose fibers with a dicyandiamide-formaldehyde condensation product, treating the suspension with a phenol-aldehyde resin and forming the suspension into a sheet by paper-making techniques. The board is then formed by bonding a plurality of said sheets together under heat and pressure whereupon the resin is cured.

The laminates of the present invention possess many advantages over those of the prior art. The laminates exhibit excellent electrical insulating properties, making them useful as printed circuit bases, switchboard and other insulating panels and insulating gaskets. They exhibit low moisture absorption and have high dimensional stability.

Another highly unusual property of the laminates of the present invention is that resin flow out of the edges of the stack of sheets does not occur in the laminating process. In prior art laminating operations, resin is forced out of the exposed edges during lamination, necessitating the cutting of the desired board out of the laminate and wasting the edges. With resin-fiber sheets of the present invention, no resin migration or flow out of the edges occurs, yielding a finished-edge board without waste of resin or sheet material. In the laminating sheets of the present invention, the resin is strongly linked to the cellulose fibers and hence resin migration cannot occur. Decorative pigments may be added to the resin-fiber sheet during the manufacture thereof, and laminates made therefrom have uniform pigmented edges usable as they come from the press. Prior art decorative laminates must be trimmed of waste resin and the trimmed edges must still be covered by metallic trim before they can be utilized as decorative table tops and the like.

Another advantage of the laminates of this invention is found in their ability to be die punched or die-stamped either hot or cold, a property which makes for ease of fabrication of printed circuit bases and other insulating panels.

In the process of the invention an aqueous pulp suspension is treated with a dicyandiamide-formaldehyde condensation product. This product is dispersible in water to form a colloidal solution. It is cationically reactive and hence is bound to the negatively-charged pulp fibers and may actually chemically link to the hydroxyl groups of the cellulose. The product is commercially available in a 30% aqueous colloidal solution as Lyofix SBK, manufactured by Ciba.

The phenol-aldehyde resin utilized in the present invention is a curable reaction product of a phenol, such as phenol, cresol, resorcinol with an aldehyde such as formaldehyde, acetaldehyde or furfural. The resin may be in various forms, as water soluble, water dispersible or precipitatable and may include various extender resins for particular laminate applications. Among those resins are:

Dispersion of powdered B-stage phenolic resin in a water solution of a water-soluble resin.

Dispersion of powdered B-stage phenolic resin in a water solution of a material capable of resin formation, such as polymethylol phenols and the like.

Dispersion of powered B-stage phenolic resin in an alkaline dispersion of Vinsol resin (terpene resin).

Dispersion of powdered B-stage phenolic resin in a reactive synthetic rubber latex.

Dispersion of powdered B-stage phenolic resin in water.

Water solution of phenolic resin containing powdered Vinsol in dispersion.

Water solution of phenolic resin with reactive synthetic rubber latex.

Colloidal solution of phenolic resin.

Mixture or combination of the above ingredients.

The phenolic resin may also be a modified phenolic resin, such as resorcinol-modified phenol-formaldehyde or aniline-modified phenol-formaldehyde resin.

*Example 1*

Unbleached kraft pulp was furnished to a beater (Canadian Standard freeness 550). Thereafter 3% (solid basis) by weight of the dry pulp of dicyandiamide-formaldehyde condensation product was added in the form of a 10% colloidal solution in water and beating continued for 15 minutes. Then an aqueous dispersion containing 140% by weight of the dry pulp of 300 mesh powdered, B-stage, cresol-modified phenol-formaldehyde and 21% by weight of the dry pulp of 2,4,6,trimethylol phenol (a water-soluble monomer) was added and beating continued for one-half hour. The pulp was then adjusted to pH 4.6 with formic acid and a 10 mil web formed on a paper machine.

The web was dried at 180–190° F. to 5% water content. Ten sheets from the web were pressed at 300° F. and 1,000 p.s.i. for 15 minutes. The resulting laminate passed the National Electrical Manufacturer Association XXXP Specification for Printed Circuit Base, showing 24 hour water absorption of less than 0.5%, a dielectric constant of 5.54 after 24 hours soaking in water. On lamination no resin flow out of the edges was observed.

*Examples II–XIV*

This series of runs illustrates the use of various resin compositions. The pulp was prepared as in Example I. The materials employed and the quality of the laminate is set forth in the following table:

| Ex. | Pulp | Percent X[1] | Resin | Laminate |
|---|---|---|---|---|
| 2 | Kraft | 3 | 21% 2,4,6 trimethylol phenol water solution, 140% B-stage cresol-modified phenolic pH 5.5 with formic acid. | XXXP Laminate. |
| 3 | Bleached Kraft | 3 | 20% 2,4,6 trimethylol phenol water solution, 118% phenol-formaldehyde, 40% aluminum powder. | Decorative Overlay. |
| 4 | do | 3 | 10% 2,4,6 trimethylol phenol water solution, 90% cresol-formaldehyde B-stage, 0.5% Wachtung Red pigment, 1.5% $TiO_2$, 2.5% Al powder. | Do. |
| 5 | Kraft Envelope Cuttings | 2 | 9% Vinsol in emulsion, 55% phenol-formaldehyde, 1.5% formic acid. | Electrical Laminate. |
| 6 | 50% Kraft bag clippings, 50% old news. | 2 | 7.5% Vinsol in emulsion, 42% phenol-formaldehyde | Laminating core stock. |
| 7 | 62% Kraft, 38% Sulfite | 2 | 8.5% Vinsol in emulsion, 53% phenol-formaldehyde | Electrical Laminate. |
| 8 | Bleached Kraft | 3 | 17.5% 2,4,6 trimethylol phenol water solution, 78% B-stage cresol-formaldehyde, 0.4% Wachtung Red, 2.3% Al Powder. | Decorative Overlay. |
| 9 | 50% Sulfite, 50% Kraft | 3 | 8% Vinsol, 54% Cresol-formaldehyde, B-stage, pH 6.1. | Electrical Laminate. |
| 10 | Bleached Kraft | 3 | 25% Vinsol, 62.5% cresol-formaldehyde, pH 4.5 with Alum, then 62.5% Al litho powder in 5% octadecyl amine dispersion. | Metallized Decorative Overlay. |
| 11 | Alpha Cellulose | 3 | 25% aniline modified phenolic, 125% B-stage phenol-formaldehyde, pH 4.0 with acetic acid. | Electrical Laminate. |
| 12 | Kraft | 3 | 25% Vinsol emulsion, 110% B-stage phenolic | Printed Circuit Lam. |
| 13 | do | 3 | 25% resorcinol-modified phenolic, 100% butadiene acrylonitrile. | Vulcanized Fiber Gaskets. |
| 14 | do | 3 | 100% B-stage phenolic, 100% butadiene-acrylonitrile | Vulcanized Fiber. |

[1] Means percent dicyandiamide-formaldehyde.

In the above examples, all percentages are on a solids basis on the weight of the dry pulp. It has been found that about 1–5% by weight of dicyandiamide-formaldehyde condensation product is effective. About 60–200% of resin has been found effective for laminating, although for core stock (thick sheet used as laminating base), lower percentage of resin may be used.

It has been found that the pH of the pulp suspension controls the curing and laminating speed. Thus, fast curing resins require no pH lowering, whereas the slower curing resins should have a pH in the range of 3–5 for rapid curing.

It is apparent that the instant process eliminates many troublesome steps in the preparation of laminates by providing a resin-fiber sheet directly by paper-making techniques and the board need not be trimmed after lamination, as no resin flows out the edges thereof.

Various additional material may be added to the resin dispersions or solutions or to the pulp, such as dyestuffs, pigments, flame retardants, subdivided metals and fungicide, to impart specific desired properties to the end product.

While the invention has been described in terms of certain examples, such examples are to be considered illustrative rather than limiting, and it is intended to cover all modifications and embodiments that fall within the spirit and scope of the appended claims.

What is claimed is:

1. The process for the preparation of a laminated board consisting treating an aqueous suspension of cellulose fibers with 1–5% of a dicyandiamide-formaldehyde condensation product, treating the suspension with 60–200% of a phenol-aldehyde resin, forming the resulting suspension into a sheet, bonding a plurality of said sheets together and curing under heat and pressure, said percentages being based on the dry weight of said fibers.

2. The process set forth in claim 1 wherein the phenol-aldehyde resin comprises a dispersion of powdered B-stage phenol-aldehyde resin in an aqueous solution of a water soluble phenol-aldehyde resin.

3. The process set forth in claim 2 wherein the B-stage phenol-aldehyde resin is B-stage phenol-formaldehyde resin.

4. The process set forth in claim 1 wherein said resin includes a terpene resin.

5. The process set forth in claim 1 wherein said resin includes an elastomer.

References Cited in the file of this patent

UNITED STATES PATENTS

| | | |
|---|---|---|
| 2,315,400 | D'Alelio | Mar. 30, 1943 |
| 2,343,095 | Smith | Feb. 29, 1944 |
| 2,351,716 | Smith | June 20, 1944 |
| 2,378,794 | Rummelsburg | June 19, 1945 |
| 2,388,293 | Schroy et al. | Nov. 6, 1945 |
| 2,400,544 | Kline | May 21, 1946 |
| 2,492,702 | Neubert et al. | Dec. 27, 1949 |
| 2,503,407 | Perry | Apr. 11, 1950 |
| 2,596,014 | Dudley et al. | May 6, 1952 |
| 2,601,598 | Daniel et al. | June 24, 1952 |
| 2,604,427 | Armstrong et al. | July 22, 1952 |
| 2,658,828 | Pattiloch | Nov. 10, 1953 |
| 2,785,975 | Sheeran | Mar. 19, 1957 |
| 2,801,672 | Baldwin et al. | Aug. 6, 1957 |